United States Patent [19]
Bernobich et al.

[11] Patent Number: 5,812,664
[45] Date of Patent: Sep. 22, 1998

[54] KEY DISTRIBUTION SYSTEM

[75] Inventors: Elizabeth Bernobich, New Haven; Richard W. Heiden, Huntington; Robert W. Sisson, Shelton, all of Conn.

[73] Assignee: Pitney Bowes Inc., Stamford, Conn.

[21] Appl. No.: 708,284

[22] Filed: Sep. 6, 1996

[51] Int. Cl.$^6$ .............................. H04L 9/08; H04L 9/00; H04L 9/30

[52] U.S. Cl. ............................ 380/21; 380/49; 380/50; 380/51; 380/54; 380/30; 380/55; 380/59

[58] Field of Search ................... 380/9, 10, 20, 380/21, 23, 30, 49, 50, 51, 55, 59, 16, 54

[56] References Cited

U.S. PATENT DOCUMENTS

| | | |
|---|---|---|
| 3,736,369 | 5/1973 | Vogelman et al. .................. 380/16 |
| 3,890,461 | 6/1975 | Vogelman et al. .................. 380/16 |
| 4,081,832 | 3/1978 | Sherman ............................. 380/16 |
| 4,605,846 | 8/1986 | Duret et al. ...................... 380/16 X |
| 5,384,846 | 1/1995 | Berson et al. ...................... 380/23 |
| 5,420,924 | 5/1995 | Berson et al. ...................... 380/23 |

*Primary Examiner*—Bernarr E. Gregory
*Attorney, Agent, or Firm*—Ronald Reichman; Melvin J. Scolnick

[57] ABSTRACT

This invention is a system for producing and distributing new decryption keys to verifiers. Verifier decryption key updates are printed in a secure manner on paper or postcards and mailed to the owners of the verifiers. The paper or postcards containing the verifier decryption key is scanned into the verifier and the verifier's key file is updated.

14 Claims, 4 Drawing Sheets

KEY DISTRIBUTION SYSTEM

CROSS REFERENCE TO RELATED APPLICATIONS

Reference is made to commonly assigned copending Patent Application Ser. No. 08/706,544 filed herewith entitled "AUTHENTICATION SYSTEM" in the names of William Berson, Beth Bemobich, Richard Heiden, Richard Potoczek, Robert Sisson, and Anthony Violante.

1. Field of the Invention

This invention relates generally to the field of security systems and more particularly to the field of cryptographic key distribution systems

2. Background of the Invention

The identification of objects or other entities is a problem at least as old as history. In modern times the most prevalent solution to the problem is the identification card which serves to establish the identity of the bearer, as well as usually some characteristic, status, or attribute of the bearer. Examples of the above are the employee badge, entry access badges, drivers license, etc. Typically, such identification cards will include a picture of the normal bearer as well as relevant information pertaining to the normal bearer in text form.

While identification cards and the like have generally proven useful for the day to day conduct of affairs nevertheless they are still subject to forgery or tampering, and indeed a moderately sized illegal industry exists for the purpose of providing false identification documents.

Cryptographic techniques have been utilized to improve the security of identification cards and the identification or authentication of documents or other forms of information. For instance, bar codes and other types of codes have been affixed to many different types of identification cards and other types of documents and articles in order to make them more difficult to forge.

One approach to the problem of providing secure identification cards is to include an image of an object to be identified (typically a person's face) on one side of the card and an encrypted signal representing a compressed representation of that image on the other side of the card. To validate the card the encrypted data is decrypted by a verifier and a representation of the print image is generated and displayed for comparison with the printed image on one side of the card.

Another problem with such identification cards and with identification cards generally, is the need to issue and/or verify such cards at multiple locations while still maintaining central accounting and control. A state, for example, may wish to verify expiring drivers licenses before issuing new licenses at numerous motor vehicle offices throughout the state while maintaining central accounting and control of the total number of licenses issued. Also, a third party provider of these services may wish to allow one or more users to issue and/or verify such identification cards at one or more locations and may wish to charge for use of the technology on a per card basis.

Typically, a verifier verifies that a document or identification card is genuine by placing one or more secure decryption keys in the verifier and if the information encoded on the identification card or document with the public key can be unlocked with one or more of the decryption keys it identifies the holder of the document or card as the person described in the encoded information. Each verifier may have different cryptographic key sets to limit the number and types of symbols that may be verified.

Periodically, the decryption keys in the verifier should be changed. The prior art changed the keys by sending service personnel to the various verifier sites to change the keys. One of the disadvantages of the foregoing is that such changes are time consuming and expensive. Another disadvantage of the foregoing is that the foregoing may be annoying to the owner of the verifier.

The prior art also utilized the telephone network to update the decryption keys in the verifier. One of the disadvantages of the foregoing is that it is difficult to train people to update decryption keys using the telephone network. It is also expensive to update decryption keys using the telephone network.

SUMMARY OF THE INVENTION

This invention overcomes the disadvantages of the prior art by providing a system for producing and distributing new decryption keys to verifiers. The foregoing system is inexpensive. Verifier decryption key updates are printed in a secure manner on paper or postcards and mailed to the owners of the verifiers. The paper or postcards containing the verifier decryption key is scanned into the verifier and the verifier's key file is updated.

DETAILED DESCRIPTION OF THE PREFERRED EMBODIMENT

Figure 1:
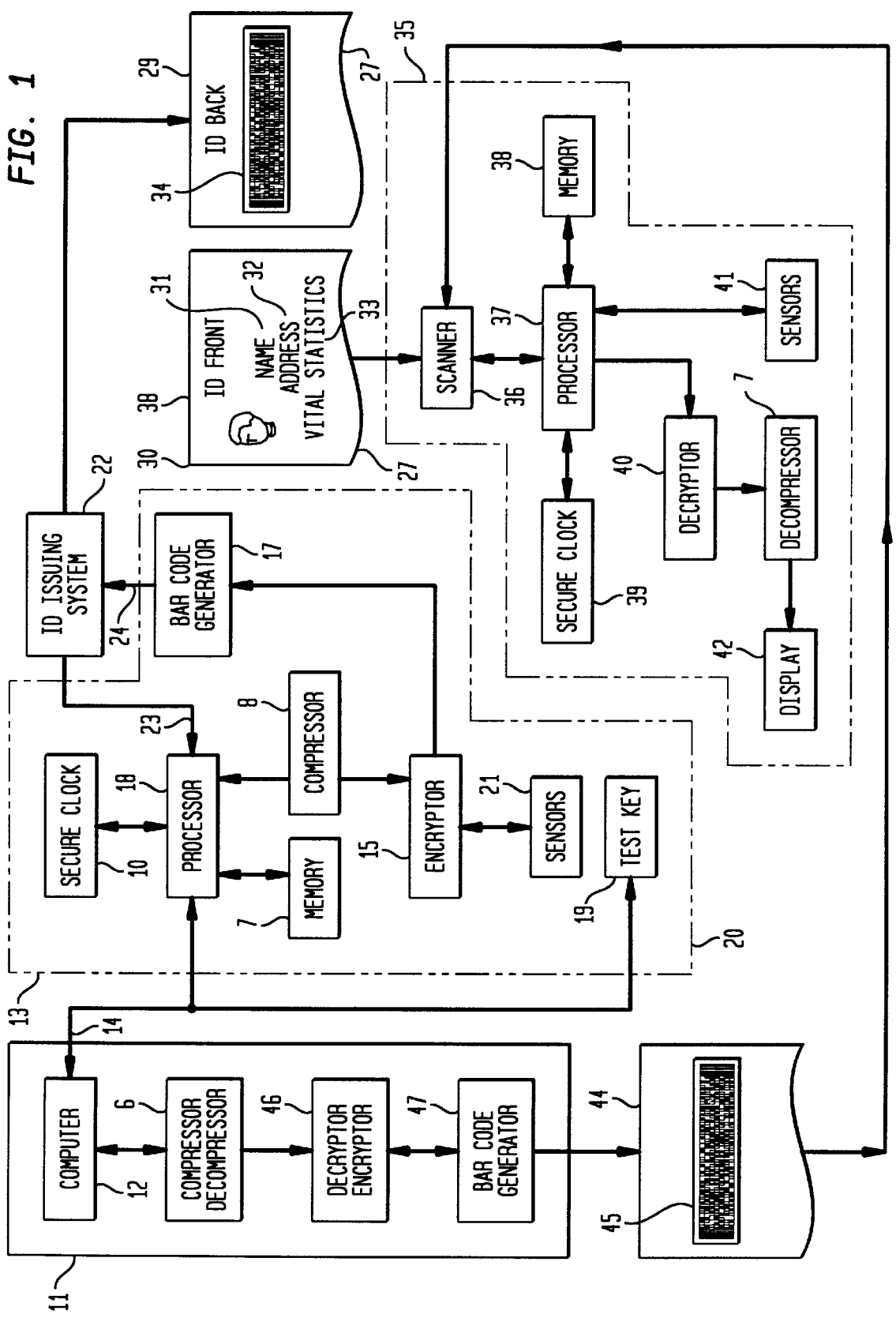
FIG. 1 is a block diagram of a system for producing identification cards and verifying that the person described in the identification card is the bearer of the identification card.

Referring now to the drawings in detail and more particularly to FIG. 1, the reference character 11 represents a data center that contains: a computer 12; a compressor/decompressor 6 that is coupled to computer 12 a decryptor/encryptor 46 that is coupled to compressor/decompressor 6; and a bar code generator 47 that is coupled to decryptor/encryptor 46. Computer 12 is coupled to authenticator 13 via communications path 14. Communications path 14 may be a telephone network, the electromagnetic spectrum, physical hard wire connections, etc. Authenticator 13 is the Pitney Bowes V110 manufactured by Pitney Bowes Inc. of Shelton, Conn.

The components of authenticator 13 are contained in a secure enclosure 20, that includes physical interlocks or sensors 21 that prevent unauthorized personnel from tampering with the components of authenticator 13. The other components of authenticator 13 that are contained in enclosure 20 include: a processor 18 that is coupled to computer 12; a memory 9 that is coupled to processor 18; a compression device 8 that is coupled to processor 18; an encryptor 15, that is coupled to processor 18 and encryption 15; a bar code generator 17, that is coupled to encryptor 15; a secure clock 10, that is coupled to processor 18 and communications path 14 that couples computer 12 to processor 18 to indicate the time information was inputted by computer 12 into authenticator 13; and a test key 19 that is coupled to computer 12 and processor 18. Periodically, authenticator 13 is inspected by the enabling of test key 19. Test key 19 may be used to test authenticator 13.

In operation encryptor 15 and processor 18 will be programmed with an encryption algorithm, as is known in the art. Reference can be had to U.S. Pat. Nos. 4,853,961, 5,073,935 and 5,142,577, herein incorporated by reference wherein suitable encryption schemes are disclosed, i.e., DES. in addition, a standard encryption scheme, such as the RSA encryption technique, can also be used for the programming of processor 18. Other encryption algorithms like Lucifer, etc. may be utilized.

Processor 18 and encryptor 15 of authenticator 13 are coupled to identification issuing system 22 via communications path 23 and bar code generator 17 is coupled to identification issuing system 22 via communications path 24. Communications path 24 may be a telephone network, the electromagnetic spectrum, physical hard wire connections, etc. Identification issuing system 22 may be any system that produces identification cards containing textual and photographic information that specifically identifies individuals. An example of system 22 is the ID-4000 manufactured by Polaroid Corporation located at Newton, Mass. 02164.

System 22 produces identification cards or documents 27. Card 27 has a front side 28 and a back side 29. Photographic 30 of the person to whom card 27 was issued appears on front side 28 of card 27, together with the name 31, address 32 and vital statistics 33 of the person to whom card 27 was issued. Bar code generator 17 will encode the information received from encryptor 15 via processor 18 and identification issuing system 22 to create a unique bar code 34, with cryptographically protected data, that is associated with the person whose card 27 is being produced. Encrypted bar code 34, contains some or all of the information contained on front side 28 of card 27. Bar code 34 is printed or affixed to back side 29 of card 27. It will be obvious to one skilled in the art that bar code 34 may be printed with an ink that is visible or invisible to the unaided human eye.

A verifier 35 is used to determine if the bearer of card 27 is the person to whom card 27 was issued. The components of verifier 35 that are contained in enclosure 43 include: a scanner 36, that reads the information contained on back side 29 of card 27, as well as the information contained in bar code 45 of card 44; a processor 37, that is coupled to scanner 36; a memory 38 that is coupled to processor 37; a secure clock 39, that is coupled to processor 37 to indicate the time information was scanned by scanner 36; a decryptor 40 that is coupled to processor 37 to decrypt the processed information; a decompressor 7 that is coupled to decryptor 40 to expand the decrypted message to its original size and a display 42 that is coupled to decompressor 7. The operator of verifier 35 will cause scanner 36 to read the information contained in card 27. The read information will be date stamped by clock 39, processed by processor 37, decrypted by decryptor 40 and displayed by display 42. The operator of verifier 35 will then compare the bearer of card 27 with the secured information encoded in bar code 34 and determine if the bearer of card 27 is the person to whom card 27 was issued.

In operation decryptor 40 and processor 37 will be programmed with an encryption algorithm, as is known in the art. Reference can be had to U.S. Pat. Nos. 4,853,961, 5,073,935 and 5,142,577, herein incorporated by reference wherein suitable encryption schemes are disclosed, i.e., DES. in addition, a standard encryption scheme, such as the RSA encryption technique, can also be used for the programming of processor 18. Other encryption algorithms like Lucifer, etc. may be utilized.

This invention utilizes encoded bar code 34 and encoded bar code 45 to transmit secure messages or information. The messages are transformed through the use of two basic elements: a set of unchanging rules or steps called a cryptographic algorithm, and a set of variable cryptographic keys. The algorithm is composed of encryption and decryption procedures. An encryption key is used to encipher plaintext into ciphertext and a decryption key is used to decipher ciphertext into plaintext. The encryption key is the private key that is used to generate, i.e. encoded bar code 34 or encoded bar code 45, and the decryption key is the public-key, i.e. the keys stored in memory 9 of authenticator 13 and memory 38 of verifier 35.

Computer 12 generates a unique client master cryptographic key pair, that includes an encryption key and a decryption key. Processor 18 of authenticator 13 generates a unique session cryptographic key pair, that includes an encryption key and a decryption key i.e. private and public key respectively The master cryptographic public-key is the key that unlocks the certificate. The certificate contains the session public key. The session public key is used to decrypt the session data. Session data may be the client public key, a certificate revocation, a new master public key or program updates for processor 37 of verifier 35. Authenticator 13 stores the private portion of session cryptographic key pair in memory 9 and transmits the public portion of session cryptographic key pair to computer 12.

Computer 12 generates: a certificate that contains a session public key; a serial number; a time stamp; expiration date; and a palindrome (a number that reads the same backwards and forwards). The aforementioned data is then encrypted with the master private key of computer 12. The certificate generated by computer 12 is transmitted to memory 9 via path 14 and processor 18. Path 14 may be a telecommunications channel, hard wire, interprocess communication, network connection, radio frequency link, etc.

The photographic and textual information appearing on front side 30 of card 27 is transmitted from ID issuing system 22 via path 23 and processor 18 to authenticator 13. Authenticator 13 compresses the photographic and textual information. Path 23 may be a telecommunications channel, hardware, interprocess communication, network communication, radio frequency link, etc. Compression device 8 is used to reduce the size of the information processed before encryption, since the more redundant the language or photograph, the smaller the compressed data storage requirements. It will be obvious to one skilled in the art that digital signatures may also be used to protect data. Hence, device 8 reduces the redundancy of the message as well as the work required to encrypt and decrypt the message. Encryptor 15 and processor 18 utilize a session private key stored in memory 9 to encrypt the compressed information. The aforementioned encrypted information is concatentated with the certificate received from computer 12 and transmitted to bar code generator 17. Bar code generator 17 generates a bar code from the above encrypted information and transmits this bar code to identification issuing system 22. Identification issuing system produces encoded bar code 34 on the back of card 27.

Computer 12 generates a key distribution certificate by creating a master distribution key-pair and a session distribution key-pair. The master cryptographic distribution key-pair includes a public-key and a private key and the session distribution key-pair included a public-key and a private key. The master cryptographic distribution public-key was stored in memory 38 during the manufacturer of verifier 35. Computer 12 compressor/decompressor 6 and encryptor/decryptor 46 then, takes the session distribution public key, a serial number, time stamp, expiration date, palindrome information and encrypts it with the master cryptographic distribution private key.

At this juncture the client's master certificate public key is encrypted with the session distribution private key. The aforementioned information is now concatenated with the key distribution certificate and bar code generator 47 generates a encoded bar code 45 on card 44 from the foregoing. It will be obvious to one skilled in the art that encoded bar code 45 may be printed with an ink that is visible or invisible to the unaided human eye.

Card 44 with encoded bar code 45 affixed thereto may be mailed to the owner of verifier 35. The owner of verifier 35 will cause scanner 36 to read the information contained in encoded bar code 45 into processor 37. Processor 37 will utilize the master cryptographic key distribution public key stored in memory 38 to decrypt the certificate (the information encoded in bar code 45, the decryption public key, serial number, time stamp, expiration date and palindrome). Memory 38 is updated with the information just decrypted. In essence, the master distribution key, the certificate revocation list, code update, and the client public key list may be updated by the information contained in bar code 45. It will be obvious to one skilled in the art that code 45 may be represented by various printed symbologies.

Figure 2:
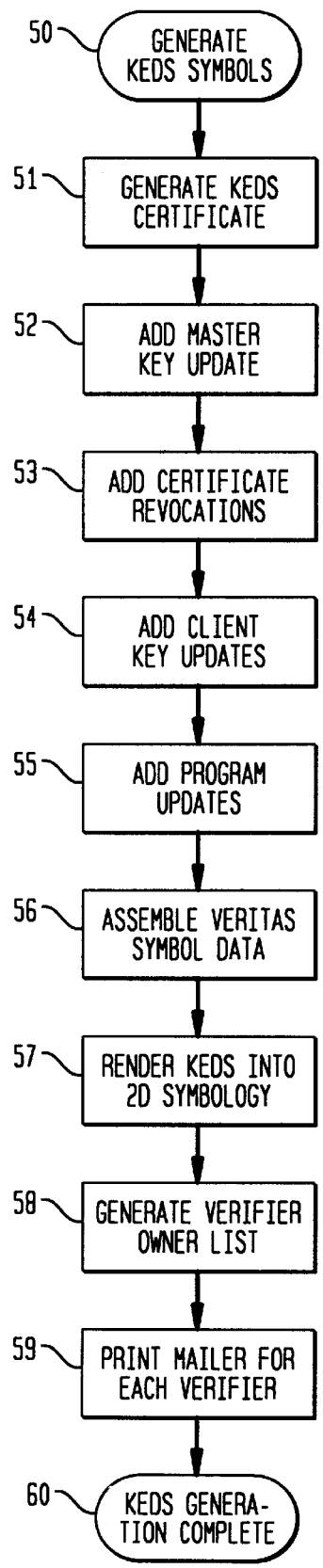
FIG. 2 is a flow chart showing the manner in which data center 11 processes KEDS.

FIG. 2 is a flow chart showing the manner in which data center 11 processes KEDS. The program begins in block 50 where the key distribution symbols (KEDS) are generated. Then the program goes to block 51 where the KEDS certificate is generated using the KEDS master private key. The generation of the KEDS master key is generated by data center 11.

Key Generation is the process by which cryptographic keys are produced. Secure key generation involves the protection of the device in which the key generation process occurs since part or all of the results must be kept secret for the keys to be useful. Also a source of large random numbers, 56 to 100's of bits long, is required in order to make unique, unpredictable keys. During the process of public key generation one or more prime numbers are calculated which requires tests for primality to be performed. Examples include the generation of RSA public keys.

The program goes to block 52, where the master key update is added. Then certificate revocations are added in block 53. In block 54, client key updates are provided, i.e., new client keys are added to the verifier. Now, program updates are provided in block 55. Symbol data is assembled in block 56 by concatenating a header, certificate and cryptographically protecting the update information i.e., cryptographically protected information added in blocks 52, 53, 54, and 55 In block 57, the KEDS data is rendered into a 2d coded symbology. Examples of 2d symbology are the PDF-417 and Data Matrix symbologies. The program then precedes to block 58. In block 58, a verifier owner list is generated. The aforementioned list is extracted from a list of all verifiers that require update information in the form of KEDS blocks. The program now goes to block 59, where a mailer is printed for each verifier that will receive the KEDS update. The mailer contains a printed address of the verifier and 2d symbology containing the KEDS data. The program then terminates in block 60, KEDS generation is complete.

Figure 3:
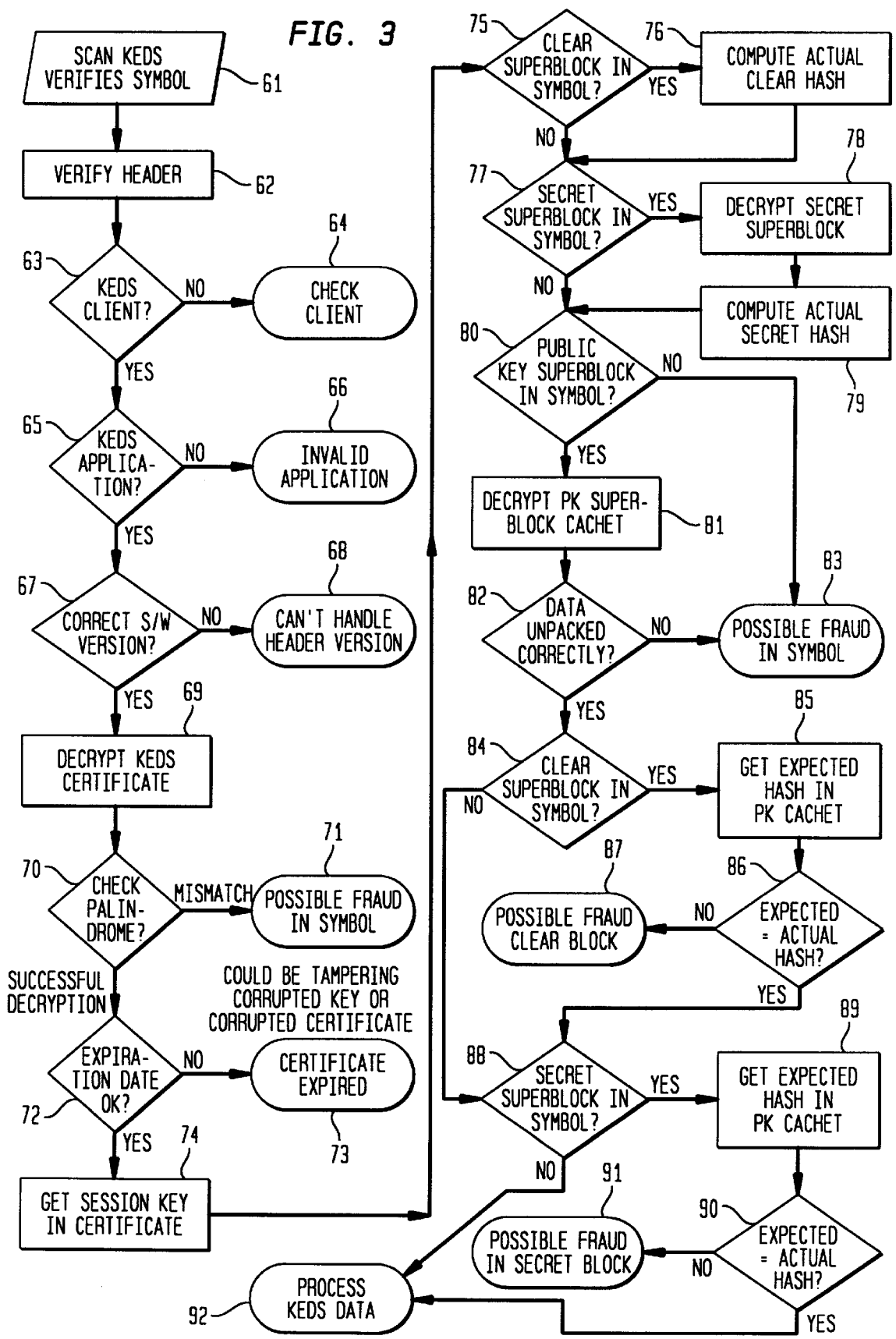
FIG. 3 is a flow chart showing the utilization of KEDS by verifier 35.

FIG. 3 is a flow chart showing the utilization of KEDS by verifier 35. In block 61, verifier 35 scans card 44 and reads bar code 45. In block 62, the header of the symbol is verified. The program precedes to decision block 63, where the KEDS client number is checked in the header. If a KEDS update client number is not found, the program goes to block 64 for other processing that checks the client. If block 64 determines that the clients KEDS number is correct, the program precedes to block 65. Block 65 determines whether or not the correct KEDS application number is present. If, the KEDS application number is invalid, the program goes to block 66 reporting invalid application and terminates the verification. If, the KEDS application number is correct, the program goes to block 67. Block 67 determines whether or not the correct software version is present. If, the correct software version is not correct the program precedes to block 68, where verification is terminated. If, block 67 determines that the software version is correct, the program goes to block 69. Block 69 uses the master KEDS public-key that was stored in verifier 35 at the time of manufacturer, or the updated master KEDS public-key that was sent by data center 11 to decrypt the KEDS certificate. The KEDS certificate is located in the scanned symbol.

At this juncture, the program goes to block 70 to check the palindrome. If, the proper palindrome was not found, the symbol may be fraudulent and the program precedes to block 71. Block 71 will terminate the program. If the palindrome is successfully decrypted the program goes to block 72. Block 72 checks the expiration date in the certificate. If, the expiration date has expired, the program goes to block 73 and terminates processing. If, block 72 determines that the expiration date has not expired, the program goes to block 74 to get the session key from the certificate. Now, the program goes to block 75, where the program checks, if there is a clear superblock in the symbol. If, there is a clear superblock, the program computes the actual clear hash in block 76 and then proceeds to block 77. If, block 75 determines that there is no clear superblock in the symbol, the program goes to block 77. Block 77 check to determine whether or not there is a secret superblock in the symbol. If, there is a secret superblock in the symbol, the program goes to block 78 to decrypt the secret superblock using the secret key. Then the program goes to block 79 to compute the actual hash of the secret superblock. Then the program goes to block 80. If, block 77 determines that there is no secret superblock in the symbol, the program goes to block 80. Block 80 determines whether or not there is a public key superblock in the symbol. If, a public key superblock exists, the program goes to block 81. Block 81 decrypts the public key superblock using the session key from the certificate. Block 81 also stores separate hash values for existing clear and/or superblocks. The program precedes to block 82 to check if the data from the public key superblock correctly unpacks. If, the data does not unpack correctly, there is possible fraud in the symbol and the program goes to block 83 to terminate the verification. If, the data is correctly unpacked, the program goes to block 84 to check again if there is a clear superblock in the symbol. If, block 84 determines that a clear superblock exists, the program goes to block 85 to get the expected hash for the clear superblock. The program now goes to block 86 and determines if the expected hash equals the actual hash. If, the actual and expected hash don't match, the program is terminated in block 87 with a indication of possible fraud in the clear block. If, the actual and expected hash match in block 86, the program goes to block 88 to check if there is a secret superblock in the symbol. If, there is, the expected hash for the secret superblock from the public-key super block cachet was obtained and the program moves to block 90. Block 90 compares the expected hash to the actual hash. If, the hashes do not match the program terminates the verification in block 91 with an indication of possible fraud in the secret block. If, the hashes match in block 90, the program goes to block 92 to process the verified KEDS symbol data. If, block 80 determined that there was no public key superblock in the symbol, the program would also proceed to block 83 and check for possible fraud. It would be obvious to one skilled in the art that other techniques of forming message digests besides hash values may be used.

Figure 4:
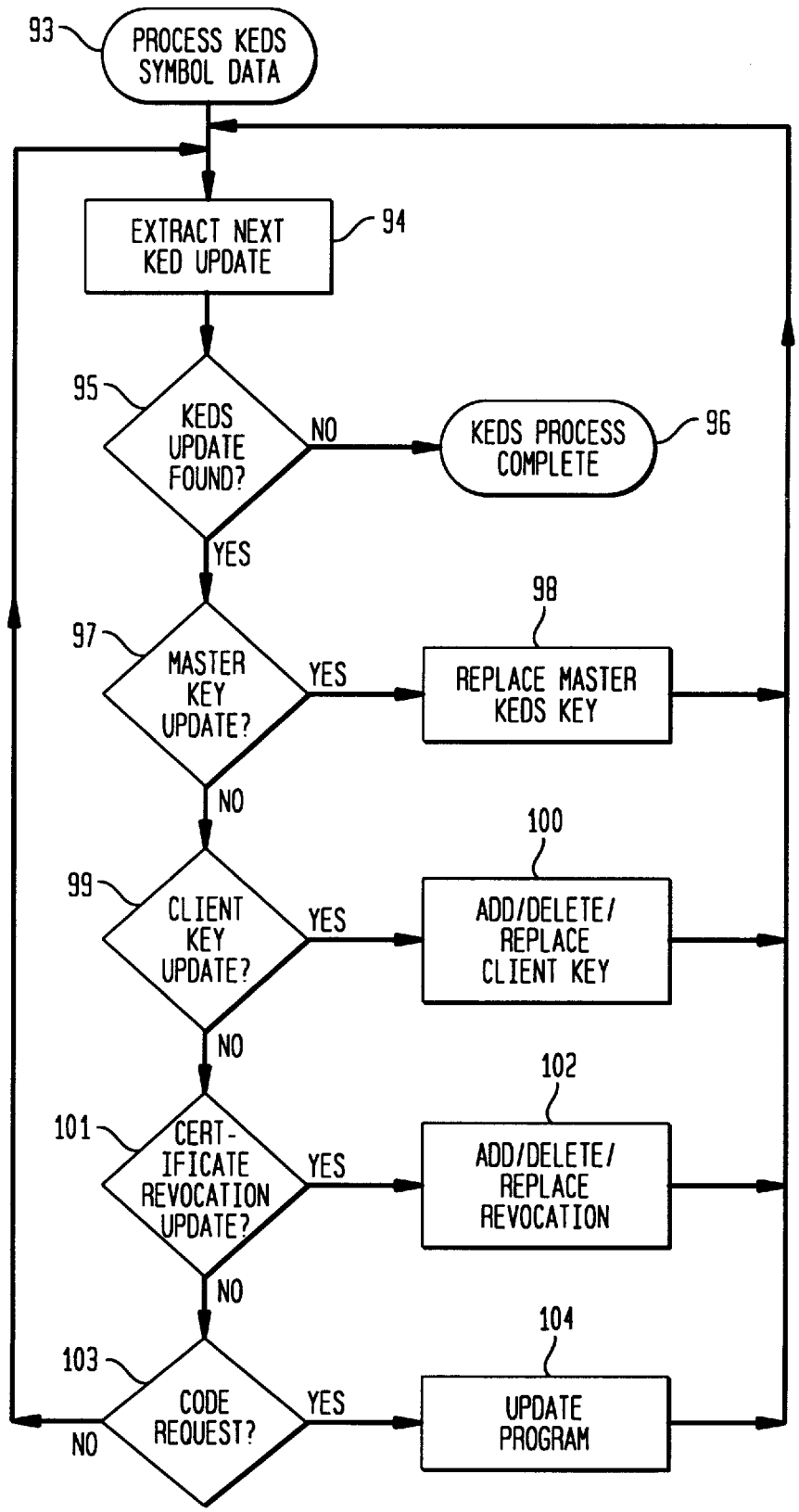
FIG. 4 is a flow chart showing what happens with KEDS update data.

FIG. 4 is a flow chart showing the manner in which the data on card 27 is utilized. The process begins in block 93 where KEDS symbol data is processed. Then, the program goes to block 94, where the program extracts the first KEDS update information. Now the program moves to block 95, where the program decides whether or not there was some KEDS update information found. If, no KEDS update information was found the program would go to block 96 and terminate the KEDS process. If, KEDS update information was found in block 95, the program would go to block 97 and check if it is a master key update. If, block 97 determines that it is a master key update, the program goes to block 98 where the program updates the verifier master key, by replacing the existing master key. If, block 97 determines that it is not a master key update, the program goes to block 99 to check if it is a client key update. If, block 99 determines that it is a client key update, the program goes to block 100 to update the client key list inside verifier 35. Updating indicates that the program can add, delete, or replace a client key. Then the program moves to block 101 and checks if this is a certificate revocation update. If, it is a certificate revocation update, the program goes to block 102 to update the verifiers certificate revocation list by adding, deleting, or replacing the new revocation. If, it is not a certificate revocation update, the program goes to block 103. The program would also go to block 103. Block 103 checks if it is a code update request. If, block 103 determines that it is a code update request, the program goes to block 104 and updates the verifier programming with new code or data fragments. After completing blocks 98, 100, 102, or 104 the program goes back to block 94 to extract the next KEDS update. The aforementioned process repeats until the program has processed all of the KEDS update information within the KEDS symbol.

The above specification describes a new and improved system for distributing cryptographic keys and updating secure information. It is realized that the above description may indicate to those skilled in the art additional ways in which the principles of this invention may be used without departing from the spirit. It is, therefore, intended that this invention be limited only by the scope of the appended claims.

What is claimed is:

1. A system for securing information for distribution and distributing information to verification equipment, said system comprising:

means for printing, encrypted information on a medium, wherein the means for printing is
   a computer that generates a key distribution certificate by creating a master distribution public key pair and a session distribution key pair an encryptor/decryptor coupled to said computer, said encryptor/decryptor encrypts the session distribution public key with the master distribution private key and encrypts the distribution with the session distribution private key;

means coupled to said encryptor/decryptor for producing symbols that represent the information encrypted by said encryptor/decryptor;

mailing the secured information to the owners of verification equipment; and means for scanning the secured information into the verification equipment to update an information key file.

2. The system claimed in claim 1, wherein the secured information is printed on a post card.

3. The system claimed in claim 1, wherein the secured information is printed on paper.

4. The system claimed in claim 1, wherein the encrypted information is secured as a cryptographic digital signature.

5. The system claimed in claim 1, wherein the secured information is printed with an invisible ink.

6. The system claimed in claim 1, wherein the means for printing information prints a decryption key.

7. The system claimed in claim 1, wherein the means for printing information prints a certificate revocation.

8. The system claimed in claim 1, wherein the means for printing information prints a program update.

9. The system claimed in claim 1, wherein the means for printing information prints:

client key updates.

10. The system claimed in claim 1, wherein the means for printing information prints:

concatentated header information; and update information.

11. The system claimed in claim 1, wherein said symbol means comprises:

a bar code generator.

12. A method for producing decryption keys and distributing decryption keys to encryption equipment, said method comprising the steps of:

printing decryption keys in a secure manner on a medium by generating a key distribution certificate by creating a master distribution public key pair and a session distribution key pair;

encrypting the session distribution public key with the master distribution private key and encrypting the distribution with the session distribution private key:

producing symbols that represent the information encrypted;

mailing the decryption keys to the owners of encryption equipment; and scanning the decryption key into the encryption equipment to update a decryption key file.

13. The method of claim 12, wherein the decryption key is printed with an invisible ink.

14. The method of claim 12, wherein the decryption key is printed as a cryptographic digital signature 2D symbol.

* * * * *